Patented Apr. 17, 1928.

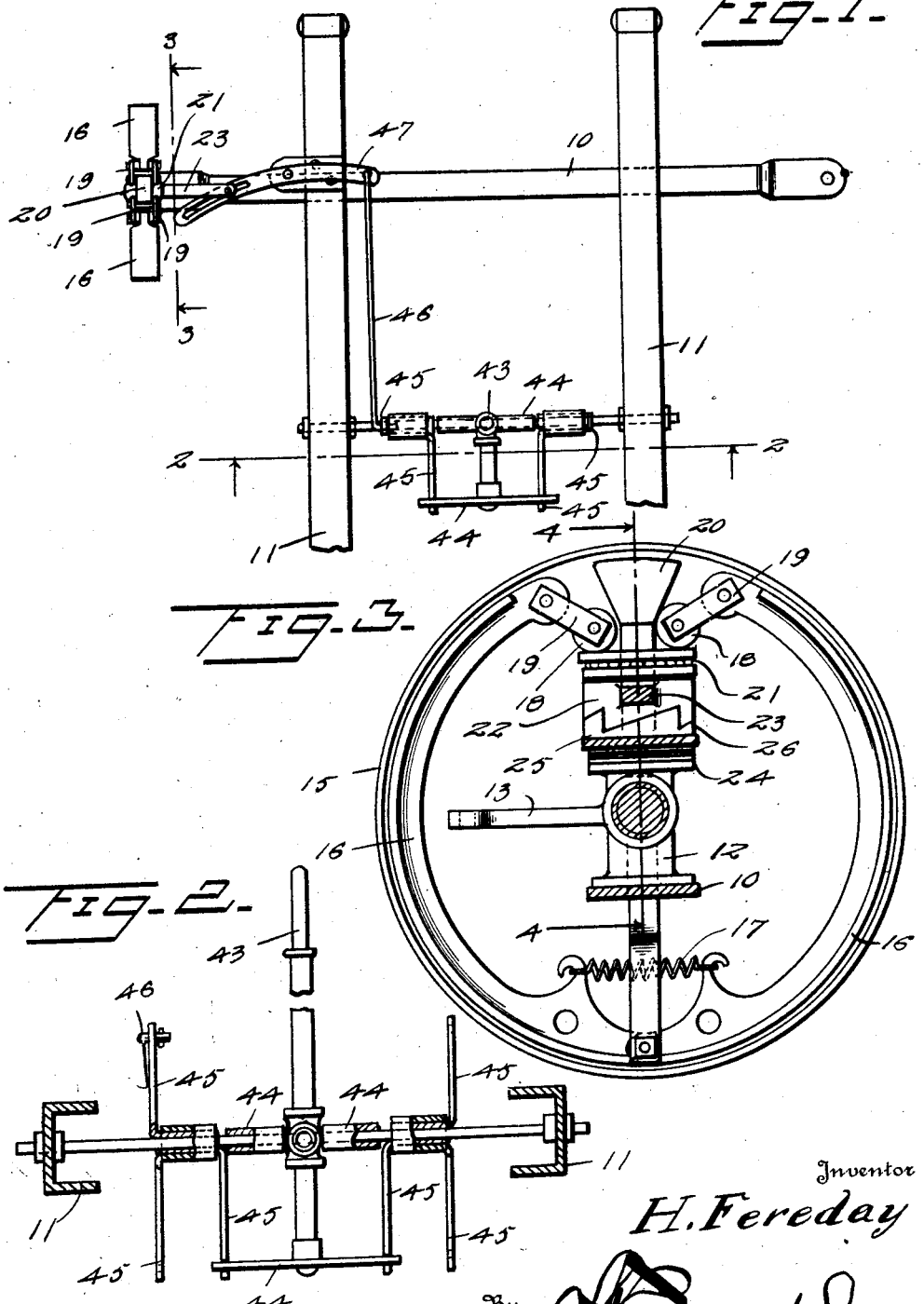

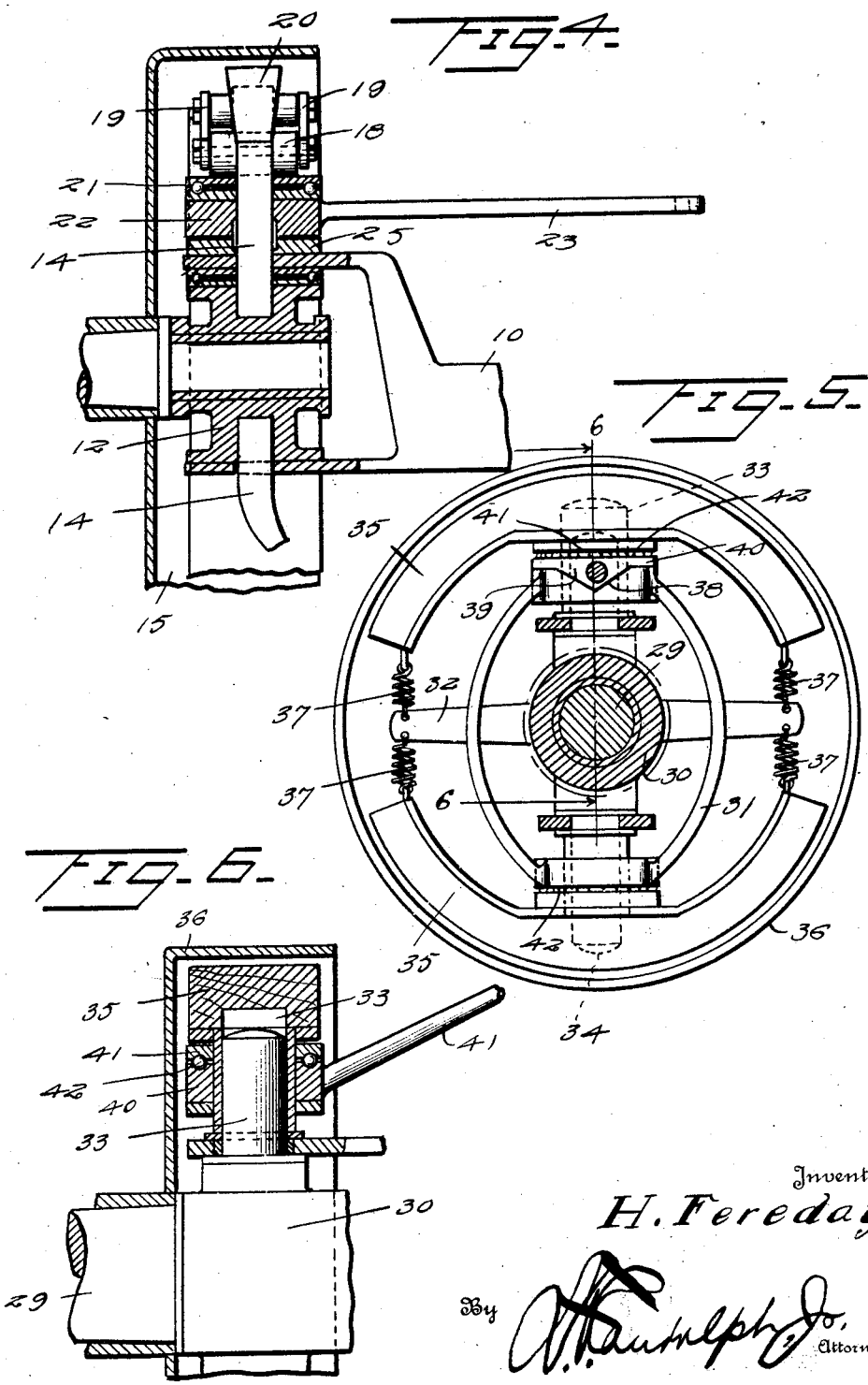

1,666,817

UNITED STATES PATENT OFFICE.

HORACE FEREDAY, OF SPANISH FORK, UTAH.

VEHICLE BRAKE.

Application filed July 10, 1924. Serial No. 725,179.

The invention relates to brake mechanism for vehicles and is designed chiefly for automobiles and to provide each of the four wheels with a brake, the operating mechanism including an evener to insure an equalization of the brakes when applied.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a detail view showing a brake adapted to the front or steering wheel of a motor vehicle, Figure 2 is a sectional detail on the line 2—2 of Figure 1, Figure 3 is an enlarged sectional view on the line 3—3 of Figure 1, Figure 4 is a detail sectional view on the line 4—4 of Figure 3, Figure 5 is a detail sectional view of a modification, and Figure 6 is a detail sectional view of the modification on the line 6—6 of Figure 5.

Corresponding and like parts are referred to in the following description and designated in the several views of the drawings by like reference characters.

The numeral 10 designates the front axle of a motor vehicle which is forked at opposite ends to receive the steering knuckles in the usual way. The longitudinal bars 11 of the chassis are adapted to be connected to the axles in any preferred way. The numeral 12 designates a steering knuckle which is provided with the usual steering arm 13 and to which are attached upper and lower vertically alined posts 14 and which also serve to pivotally connect the steering knuckle 12 to the members of the fork at the outer end of the axle. The numeral 15 denotes the usual brake drum rotatable with the wheel, not shown. Brake members 16 coact with the brake drum and are normally held released by a spring 17. Rollers 18 are connected by links 19 to the ends of the brake members 16 and are adapted to ride upon the inclined sides of a wedge 20 when the brake is applied. This wedge is fixed and may form a part of the upper pivot 14. A ball bearing 21 is mounted upon the upper pivot 14 and the rollers 18 rest thereon. A collar 22 mounted on the upper pivot 14 has an arm 23 projecting therefrom. A ball bearing 24 is interposed between the knuckle 12 and a member 25. Interengaging clutch or cam projections 26 are provided on the member 25 and the collar 22 and effect a vertical movement of the collar when the latter is rotated whereby to lift the ball bearing 21 and rollers 18 which riding upon the wedge 20 spread the upper ends of the members 16 and apply the brake.

In the modification shown in Figures 5 and 6 a frame is mounted upon the spindle 29 and comprises a hub 30, a yoke 31, oppositely disposed frames 32, and upper and lower vertically alined pivots 33 and 34. Upper and lower brake members 35 are mounted upon the respective pivots 33 and 34 and are disposed upon the inner side of a brake drum 36. Helical springs 37 connect the ends of the brake members 35 with the outer ends of the arms 32 and normally hold the brake members clear of the brake band or drum 36. The yoke 31 is mounted upon the pivots 33 and 34 and its upper end has a V-shaped depression 38 which receives a V-shaped projection 39 of a member 40 loosely mounted upon the pivot 33 and having an offstanding arm 41. Ball bearings 42 are interposed between the brake members 35 and the yoke 31 and when the member 40 is turned in either direction the V-shaped projection 39 riding out of the V-shaped depression 38 effects separation of the brake members 35 which are brought into engagement with the brake band or drum 36, thereby setting the brakes.

It is observed that each of the wheels of a vehicle may be similarly equipped with a brake substantially as herein described and that the brakes are simultaneously applied. This is effected by means of a brake lever 43 and an evener mechanism, the latter including a frame 44 and upper and lower arms 45. A rod 46 connects each of the arms 45 with a lever 47 which is connected to the arm 23 or 41.

What is claimed is:—

1. In brake mechanism, a post, a collar slidable on said post, means having cam engagement with said collar turnable relatively thereto to thereby effect the sliding movement of the collar, a wedge adjacent said collar, and braking mechanism movable against said wedge by said collar to expand the mechanism.

2. In a vehicle brake, brake shoes, means pivoting said brake shoes at adjacent ends thereof, links pivotally engaging the free ends of said brake shoes, rollers journaled by said links, a collar supporting said rollers, said collar being rotatable and having cam engagement with its support, and a wedge engageable by said rollers to move the brake shoes into braking positions.

3. In a vehicle brake, in combination with a forked axle, a knuckle rotatable in the axle fork, a post journaling said knuckle, brake shoes, means pivoting said brake shoes at their adjacent ends, links pivotally engaging the free ends of said brake shoes, rollers journaled by said links, a collar rotatably and slidably mounted on said post and supporting said rollers, said collar having cam engagement with its support, and a wedge on said post and engageable by said rollers to move the brake shoes into braking positions.

4. In a vehicle brake, in combination with a forked axle, a knuckle rotatable in the axle fork, posts journaling said knuckle between the arms of the fork, brake shoes, the adjacent ends of said brake shoes pivotally engaging one of said posts, links pivotally engaging the free ends of said brake shoes, rollers journaled by said links, a collar rotatably and slidably mounted on the other of said posts and supporting said rollers, said collar having cam engagement with its support and a wedge on the last mentioned post and engageable by said rollers to move the brake shoes into braking positions.

In testimony whereof I affix my signature.

HORACE FEREDAY.